219-121 SR

7/27/82 OR 4,341,941

United States Patent [19]

Tateno

[11] 4,341,941

[45] Jul. 27, 1982

[54] METHOD OF OPERATING A PLASMA GENERATING APPARATUS

[75] Inventor: Haruo Tateno, Kiyose, Japan

[73] Assignee: Rikagaku Kenkyusho, Wako, Japan

[21] Appl. No.: 124,938

[22] Filed: Feb. 26, 1980

[30] Foreign Application Priority Data

Mar. 1, 1979 [JP] Japan .................................. 54-23629
Mar. 1, 1979 [JP] Japan .................................. 54-23630

[51] Int. Cl.³ ................................................ B23K 9/00

[52] U.S. Cl. ...................... 219/121 PU; 219/121 PQ; 219/121 PU; 219/121 PM; 219/75; 313/231.5

[58] Field of Search ...... 219/121 P, 121 PR, 121 PQ, 219/121 PP, 121 PU, 121 PW, 121 PM, 74, 75; 313/231.4, 231.5

[56] References Cited

U.S. PATENT DOCUMENTS

| | | | |
|---|---|---|---|
| 3,575,568 | 4/1971 | Tateno | 219/121 PQ |
| 3,770,935 | 11/1973 | Tateno et al. | 219/121 PP |
| 3,949,188 | 4/1976 | Tateno | 219/121 PQ |
| 4,121,083 | 10/1978 | Smyth | 219/121 PQ |
| 4,163,891 | 8/1979 | Komatsu et al. | 219/121 PQ |

*Primary Examiner*—B. A. Reynolds
*Assistant Examiner*—M. Paschall
*Attorney, Agent, or Firm*—Edward J. Kondracki

[57] ABSTRACT

Disclosed is a method of operating a plasma generating apparatus including at least one multi-bushed torch unit. The ratio of inside gas flow rate-to-outside gas flow rate in the channels of the torch unit are experimentally determined so as to assure the alignment of the electric arc in the torch unit, and the plasma generating apparatus is operated with the gases flowing at the so-determined flow rates.

1 Claim, 12 Drawing Figures

METHOD OF OPERATING A PLASMA GENERATING APPARATUS

This invention relates to a method of operating a plasma generating apparatus including a single-or dual-plasma torch structure. The single-plasma torch structure comprises one multi-bushed torch unit, whereas the dual-plasma torch structure comprises two multi-bushed torch units arranged crosswise to each other.

Simply for the sake of convenience, first, a method of operating a plasma generating apparatus including a dual plasma torch structure is described. As is well known, a dual plasma torch structure is composed of two multi-bushed torch units which are so arranged that the streams of plasma from those multi-bushed torch units merge into a single stream. One of the torch units has two or more bushings around and in the exact alignment with its center electrode, and is operated with its center electrode (i.e. the one from which the arc column extends) in the negative polarity. This is called "Positive Polarity Plasma Arc Torch". The other torch unit has two or more bushings, and is operated with its center electrode in the positive polarity. This is called "Reverse Polarity Plasma Arc Torch". In operation a "hair-pin" arc appears between these positive and reverse polarity torches, heating a merging plasma stream, and generating a plasma flame at an elevated temperature. This plasma flame generating method is easy to practice, and still advantageously it enables thermic ionization of oxygen, air and other gases. The plasma flame so established, however, is not stable, varying in direction with the flow rate of gas, electric current and other operational factors. For this reason the dual torch structure has been industrially deemed of little or no use.

The inventor has found that the cause for trouble in operation is the misalignment of the electric arc with the center axis of the torch. He has experimentally confirmed that the alignment of the electric arc if attained, permits the increase of energy concentration without causing a double arc, and that it assures the straightening of the plasma flame.

One object of this invention is to provide a method of operating a plasma generating apparatus including a dual-plasma torch structure in such an arc-alignment condition that the plasma generating apparatus can be applied to a variety of industrial works.

This object is attained according to this invention, by experimentally determining a ratio of the inside gas flow rate-to-the outside gas flow rate so as to put an electric arc in alignment with the center axis of a torch unit, and by putting the torch unit in operation at the so-determined flow rates. Specifically, a dual-plasma torch structure is operated by supplying to the inside channel or channels of the positive polarity multi-bushed torch unit a gas the flow rate of which is equal to or larger than the flow rate at the coordinate of the valley point on a thermal loss-to-inside gas flow rate graph, which is plotted while maintaining at a given constant a total flow rate of gases in the outside and inside channels of the positive polarity torch unit. The "inside channel or channels" of the positive polarity multi-bushed torch unit are intended to mean the annular channel around the center electrode in a two-bushed torch unit, and the innermost annular channel around the center electrode plus the annular channel surrounding the innermost channel in a three-bushed torch unit.

A single plasma torch structure is composed of a multi-bushed torch unit which has two or more bushings around its center electrode, each bushing having a throttle in the exact alignment with the center electrode. In operation a stream of argon, helium and other inactive gases or air, oxygen and other active gases flow through the throttle of the outermost torch bushing to a workpiece, which constitutes a counter electrode. An electric arc extends from the center electrode to the workpiece through the corresponding length of the gas stream, performing welding, cutting or other working on the workpiece with a highly concentrated electric energy on the spot. The point at which the increase of concentration of electric energy must stop is at the appearance of a double arc across the bushing throttles. The double arc is easy to appear when the arc column is not in alignment with the center axis of the torch unit. As mentioned above misalignment of the electric arc column has been preventing the enlargement of application of the single plasma torch structure to a variety of industrial uses.

Another object of this invention, therefore, is to provide a method of operating a plasma generating apparatus including a single plasma torch structure in such an arc-aligning condition that a double arcing is prevented, permitting the increasing of the concentration of electric energy to possible maximum.

This object is attained by, according to this invention, supplying to the inside channel or channels of a multi-bushed torch unit a gas the flow rate which is equal to or larger than the flow rate at the coordinate of the valley point on a thermal loss-to-inside gas flow rate graph, which is plotted while maintaining a total flow rate in the outside and inside channels of the torch unit at a given constant and while operating along with another multi-bushed torch like a dual plasma torch structure. In this case the torch to be used is operated as Positive Polarity Torch, whereas the other torch is operated as Reverse Polarity Torch.

Other objects and advantages of this invention will be understood from the following description of preferred embodiments shown in the accompanying drawings.

Figure 1:
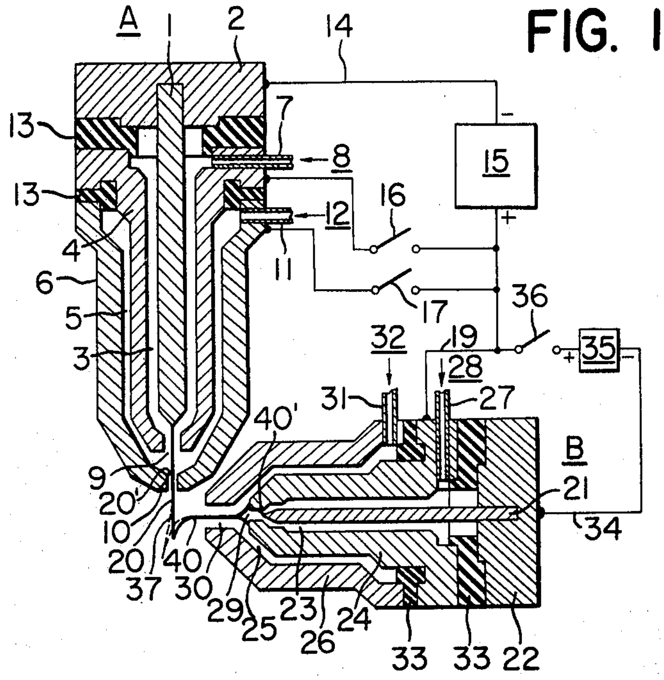
FIG. 1 shows diagrammatically a plasma generating apparatus including a dual plasma torch structure which can be operated according to this invention.

Referring to FIG. 1, there is shown a plasma generating apparatus including a dual plasma torch structure comprising a positive polarity multi-bushed plasma arc torch "A" (hereinafter referred to as "Torch A") and a reverse polarity multi-bushed plasma arc torch "B" (hereinafter referred to as "Torch B"), which is arranged crosswise to Torch A.

As shown, Torch A is composed of a cathode electrode 1, a cathode holder 2, a first bushing 4 to define a first annular channel 3 around the cathode rod, and a second bushing 6 to define a second annular channel 5 around the first bushing 4. Argon, helium or any other gas which is chemically inactive to the material of the cathode electrode is supplied to the first annular channel 3 through a gas inlet 7. The inactive gas 8 is ejected from the throttles 9 and 10. An inactive gas is supplied to the second annular channel 5 through the gas inlet 11. This inactive second gas 12 is ejected from the throttle 10. The holder 2, the first bushing 4 and the second bushing 6 are electrically isolated from each other by insulators 13. The holder 2 is connected to the negative terminal of a power supply 15 through a conductor 14. The first and second bushings 4 and 6 are connected to the positive terminal of the power supply 15 through switches 16 and 17.

As shown, Torch B is composed of an auxiliary cathode rod 12, a holder 22, a first bushing 24 to define a first annular channel 23 around the auxiliary cathode rod 21 and a second bushing 26 to define a second channel 25 around the first bushing 24. A first inactive gas 28 is supplied to the first annular channel 23 through a gas inlet 27, and is ejected from the throttles 29 and 30. An inactive second gas 32 is supplied to the second annular channel 25 through a gas inlet 31, and is ejected from the throttle 30. The holder 22, the first bushing 24 and the second bushing 26 are electrically isolated from each other by insulators 33. The holder 22 is connected to the negative terminal of an auxiliary power supply 35 through a conductor 34. The first bushing 24 is connected to the positive terminal of the power supply 15 through a conductor 19, and at the same time, is connected to the positive terminal of the auxiliary power supply 35 through the switch 36.

Water cooling means (not shown) are provided to the first and second bushings 4 and 6, and the holder 2 of Torch A and to the first and second bushings 24 and 26, and the holder 22 of Torch B, respectively.

The plasma generating apparatus of FIG. 1 is operated as follows:

(1) In Torch A; First, the switches 16 and 17 are closed. A first inactive gas 8 is supplied to the first channel 3, and an arc is established between the cathode rod 1 and the first bushing 4 with the aid of a high frequency power supply, which is contained in the electric source 15. Then, the switch 16 is opened while the switch 17 remains closed, thereby causing the arc foot to shift from the first bushing 4 to the second bushing 6. Thus, Torch A works as a non-transfer type plasma jet apparatus.

(2) In Torch B: First, the switch 36 is closed, and a first inactive gas 28 is supplied to the first annular channel 23. An electric arc 40' is established between the auxiliary cathode rod 21 and the first bushing 24 with the auxiliary power supply 35. The plasma jet is directed to the crossing point 37 of the center axses of the two torches.

(3) In this situation the switch 17 is opened, and then a "hair-pin" arc appears between the cathode rod 1 of Torch A and the first bushing 24 of Torch B.

(4) An inactive second gas 12 is supplied to the second annular channel 5 of Torch A, and then the first gas 8 is stopped. Also, a second gas 32 is supplied to the second annular channel 25 of Torch B, and then the first gas 28 is stopped. The switch 36 is opened, causing an auxiliary arc 40' to disappear. Then, the arc current from the power supply 15 is increased to a proper value.

The "hair-pin" arc extending from Torch A to Torch B heats and converts the merging plasma jet to a plasma flame. As mentioned earlier, the plasma flame thus established is not stable, changing in direction with gas flow rate, arc current and other operating factors.

Figure 2:
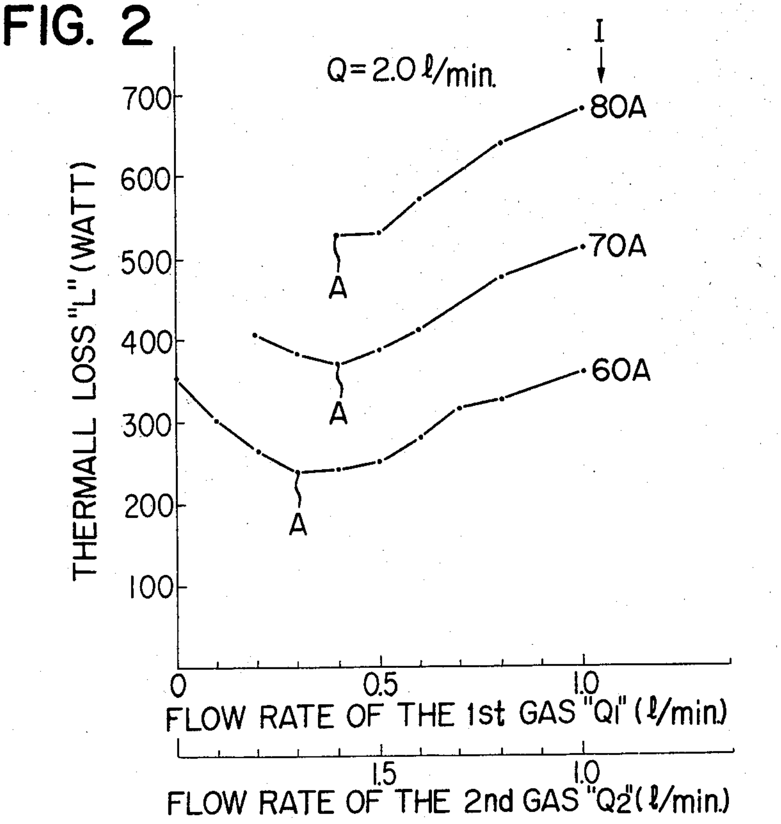
FIGS. 2 and 3 show graphs representing the thermal loss-to-inside gas flow rate characteristics of the plasma generating apparatus of FIG. 1.
Figure 3:
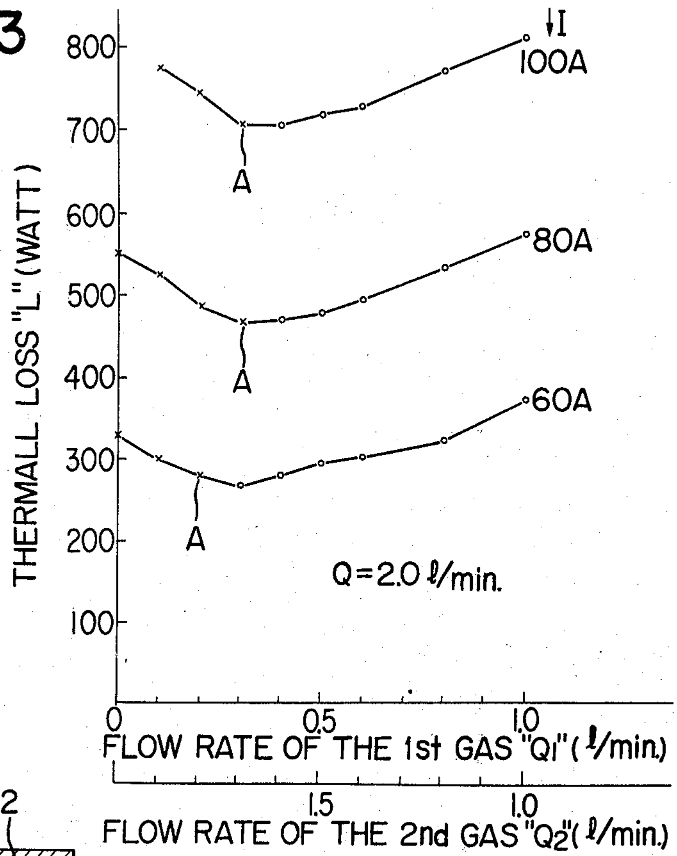
Figure 4:
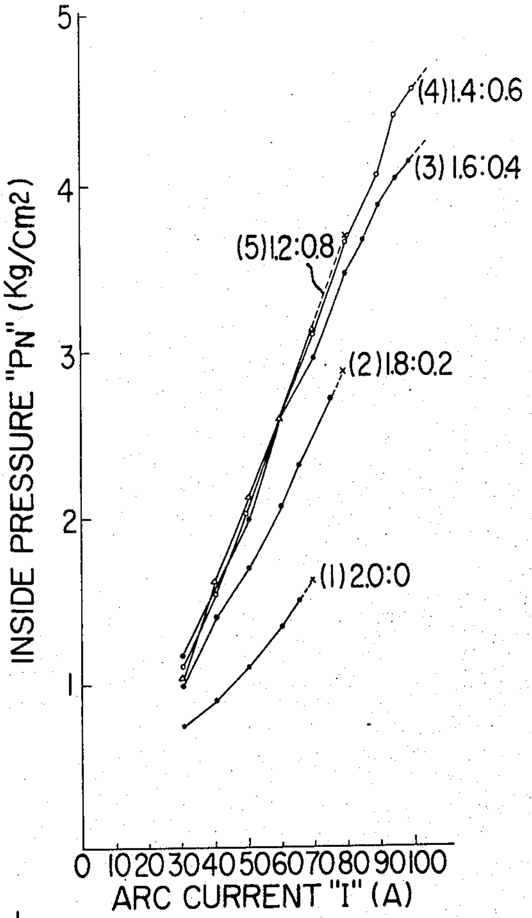
FIG. 4 shows a graph representing the inner pressure-to-arc current characteristics of the plasma generating apparatus of FIG. 1 for different inner-to-outer gas flow rates.

Now, referring to FIGS. 2, 3 and 4, the method of operating a plasma generating apparatus including a dual plasma torch structure according to this invention is described. First, the behavior of the first inactive gas flowing the first channel of Torch A is discussed. Keeping the total flow rate "Q" of the flow rate "$Q_1$" of the first gas 8 plus the flow rate "$Q_2$" of the second gas 12 at a given constant, and increasing "$Q_1$" from zero (accordingly decreasing "$Q_2$"), the thermal loss "L" at the second bushing 6 is measured in terms of the rise of the temperature of the cooling water. Some examples of thermal loss-to-inner gas flow rate characteristic curves thus determined are shown in FIG. 2.

The measurement factors in determining the characteristics of the plasma generating apparatus were:

Throttle of the 1st bushing of Torch A: 3.0 mm in diameter, 3.0 mm long

Throttle 10 of the 2nd bushing of Torch A: 1.0 mm in diameter, 0.8 mm long

Throttle 29 of the 1st bushing of Torch B: 2.0 mm in diameter, 2.0 mm long

Throttle 30 of the 2nd bushing of Torch A: 3.0 mm in diameter, 4.0 mm long

Distance from the crossing point 37 to the tip of each torch: 10 mm

Angle between the center axes of Torchs A and B: 100 degrees

Total flow rate $Q_1$ plus $Q_2$ of Torch A: argon, 2.0 $^l$/min.

Flow rate $Q_3$ of the 2nd gas 32 in Torch B: argon, 1.0 $^l$/min.

If the second bushing 6 of Torch A is put too close to the crossing point 37, the ordinate of the valley point (or the thermal loss at the valley) will increase. Contrary to this, if the second bushing 6 of Torch A is put too apart from the crossing point 37, the "hair-pin" arc will be unstable. The abscissa of the valley point (or the flow rate of the first gas at the valley) will not vary if the second bushing 6 of Torch A is 5–15 mm apart from the crossing point 37 and if the crossing angle remains in the range from 90 to 114 degrees. The second bushing 26 of Torch B can be put so apart from the crossing point 37 as the voltage of the power supply permits.

As seen from FIG. 2, the thermal loss "L" decreases with the flow rate "$Q_1$" of the first gas, and then increases after passing the minimum point "A".

When the plasma generating apparatus works at any points on the first declining parts of the curves, the part of the arc leg 20 inside of the torch unit A deviates from the center axis of the torch unit A, although the part of the arc leg 20 out of the torch unit A extends in alignment with the center axis of the torch unit A. Because of the deviation of the inside part of the arc leg towards the inner wall of the throttle of the outermost bushing the increase of the electric current is easy to cause a double arc in the throttle of the outermost bushing. Thus, the plasma generating apparatus when working at any points on the first declining parts, works at a decreased concentration of energy, although the straightness of arc extension is maintained.

Similar measurements were made on another dual torch structure the second bushing of which has a throttle larger in diameter than the throttle of the second bushing of the dual torch structure above mentioned. Specifically, the throttle was 2 mm in diameter and 2 mm long. The results are shown on FIG. 3. The "cross" marks (x) on different curves show the coordinates at which the arc leg 20 deviates from the center axis of Torch A whereas the "circle" marks (o) show the coordinates at which the arc leg 20 extends straight in alignment with the center axis of Torch A. Thus, when the dual torch structure works at any points on the rising parts of the curves, the exact alignment of the arc leg 20 is assured, and therefore the arc current can be increased without any fear for double arcing. In other words the plasma generating apparatus can work at an increased concentration of energy with the arc leg and hence plasma flame exactly in alignment.

As is apparent from the above, irrespective of what size the throttle of the outermost bushing is of, a flow rate of the first gas $Q_1$ and a flow rate of the second gas $Q_2$ in the portions rising from the valley points A assure the alignment of the arc leg, and hence an increased concentration of energy at which the plasma generating apparatus can work.

Referring to FIG. 4, there are shown curves each representing the inside pressure-to-arc current characteristics for different ratios of second-to-first flow rate ($Q_2$:$Q_1$). The pressure in the second channel "$P_N$" (kg/cm$^2$) in the ordinate is directly proportional to the output of the torch unit A if "Q", "I" and the shape and size of the throttle are not changed. As is apparent from FIG. 4, particularly from the curves marked (2), (3) and (4) in which the flow rates of the first and second gases are in the rising parts (right) from the valley points A in FIG. 2, an increment of the arc current causes a multiplying effect on the inside pressure, or the concentration of energy at which the plasma generating apparatus. In contrast, as seen from the curve marked (1) in which the flow rates of the first and second gases are in the first descending part (left) to the valley point A in FIG. 2, an increment of the arc current causes a less effect on the concentration of energy.

As for the point at which the increase of $Q_1$ stops, the share of the inside gas flow rate $Q_1$ in the total flow rate Q can be increased to the extent that the maximum arc current is just above the one which is permitted when no gas flows in the inside channel of the torch, as for instance 70 amperes on the curve marked (1) in FIG. 4.

Figure 5:
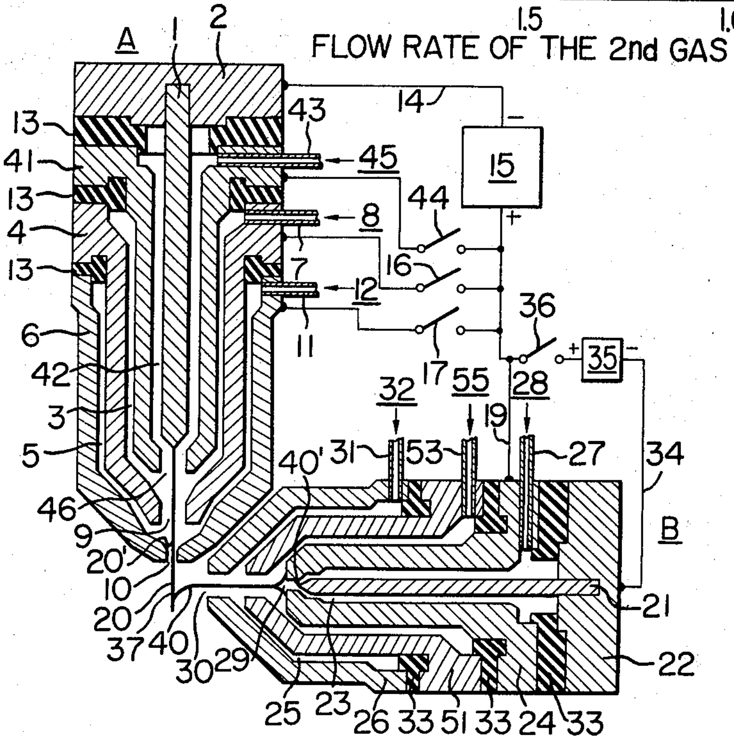
FIGS. 5 and 6 show diagrammatically plasma generating apparatuses each including a dual plasma torch structure which can be operated according to this invention.

Referring to FIG. 5, there is shown another plasma generating apparatus including a dual torch structure which apparatus can be operated according to this invention. As shown, Torchs A and B each having three bushings, are capable of establishing a plasma flame of highly active gas content. The same reference numerals as used in FIG. 1 are used to indicate the same parts of the plasma generating apparatus in FIG. 5. Torch A in FIG. 5 is the same as Torch A in FIG. 1 except for a third bushing 41 between the first bushing 4 and the cathode rod 1; a gas inlet 43 to supply a gas to the so defined third annular channel 42; and an associated electric circuit including a switch 44 for arc-shifting use. Also, Torch B in FIG. 5 is the same as Torch B in FIG. 1 except for a third bushing 51 between the first bushing 24 and the second bushing 26 and a gas inlet 53. The same Torch B as in FIG. 1 can be used without deteriorating significantly the performance of the plasma generating apparatus.

The plasma generating apparatus can be operated using an inactive gas as follows:

(1) In Torch A, the switches 44, 16 and 17 are closed. A third gas 45 is supplied to the annular channel 42, and an electric arc is built between the cathode rod 1 and the third bushing 41 with the aid of a high-frequency power supply contained in the electric source 15. Then, the switch 44 is opened, and subsequently the switch 16 is opened, but the switch 17 remains closed. Thus, the arc foot is shifted from the innermost bushing 41 to the outermost bushing 6 via the intervenient bushing 4, as indicated at 20'.

(2) In Torch B, the switch 36 is closed, and a first gas 28 is supplied to the annular channel 23 to establish a non-transfer type arc 40' between the auxiliary cathode rod 21 and the first bushing 24. Then, a plasma jet is produced and is directed to the crossing point 37 at which the center axes of Torchs A and B cross each other.

(3) Then, the switch 17 is opened, causing a "hair-pin" arc to appear between the cathode a rod 1 of Torch A and the first bushing 24 of Torch B as indicated at 20 and 40.

(4) The second gas 12 is supplied to the annular channel 5 of Torch A, and then the third gas 45 is stopped. On the other hand in Torch B the second gas 32 is supplied to the annular channel 25, and then the first gas 28 is stopped. The switch 36 is opened to cause the auxiliary arc 40' to disappear. The current I from the power supply 15 is controlled.

(5) An inactive gas as much as required for protecting the cathode electrtode is supplied as the third gas 45 and 55 to Torch A and Torch B respectively. At this stage the second gas 12 in Torch A and the second gas 32 in Torch B are replaced by an active gas. Thus, an active gas plasma flame is produced, surrounding and heated by the "hair-pin" arc.

According to this invention the flow rates of the first and second active gases 8 and 12 are determined as follows:

First, it should be noted that a given constant flow rate of inactive gas 43 is supplied to the third annular channel 42 of Torch A to protect the cathode rod 1. The total amount of the flow rates of different gases, $Q_{12}$ plus $Q_{11}$ plus $Q_2$, are kept constant, where "$Q_{12}$" stands for the given constant flow rate of the inactive gas 45 in the annular channel 42; "$Q_{11}$" stands for the flow rate of the active gas 8 in the annular channel 3; and "$Q_2$" stands for the flow rate of the active gas 12 in the annular channel 5. The temperature rise of the second bushing 6 is measured in terms of the temperature of the cooling water while increasing $Q_{11}$. Then, the temperature rise of the second bushing 6 is plotted against $Q_1(=Q_{11}+Q_{12})$ to determine the abscissa ($Q_1$) of the valley point A.

Then, the given constant flow rate $Q_{12}$ of inactive gas 43 is supplied to the annular channel 42; the flow rate $Q_{11}$ of active gas 8 which is equal to or larger than the abscissa of the valley point A is supplied to the annular channel 3; and the flow rate $Q_2$ of active gas 12 which is determined as the remainder in subtracting the so-determined $Q_1$ from the fixed total amount of the flow rates of different gases in Torch A. When the plasma generating apparatus operates at these specified flow rates of inactive and active gases, the arc column, and hence the plasma flame is straight exactly in alignment, and an increased electric current can flow, as seen from the following example in which the same torch unit as Torch B in FIG. 1 was used as a substitute for the corresponding torch unit in FIG. 5:

Throttle 46 of the 3rd bushing of Torch A: 2.6 mm, in diameter. 2.0 mm long
Throttle 9 of the 1st bushing of Torch A: 4.0 mm in diameter, 3.0 mm long
Throttle 10 of the 2nd bushing of Torch A: 1.0 mm in diameter, 0.7 mm long
Throttle 29 of the 1st bushing of Torch B: 2.0 mm in diameter, 2.0 mm long
Throttle 30 of the 2nd bushing of Torch B: 3.0 mm in diameter, 4.0 mm long
Flow rate $Q_{12}$ in Torch A: argon, 0.25 l/min.
Flow rate $Q_{11}$ in Torch A: air, 0.15 l/min.
Flow rate $Q_2$ in Torch A: air, 5.6 l/min.
Flow rate $Q_3$ in Torch B: argon, 1.0 l/min.

The inside pressure was 5 kg/cm$^2$, and the arc current was 90 amperes (the current density being 115 A/mm$^2$). The air concentration was 96 percents. The operation was quite stable and the plasma flame extended straight exactly in alignment with the center axis of Torch A.

Figure 6:
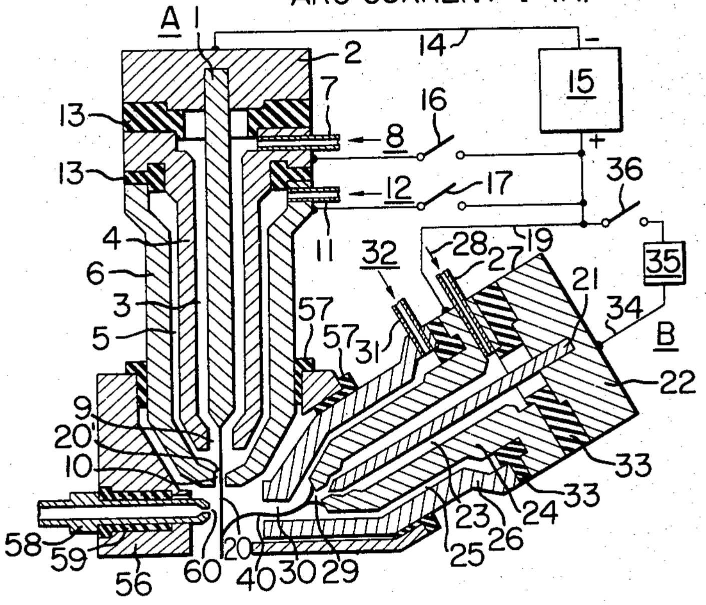

Referring to FIG. 6 there is shown still another plasma generating apparatus which can be operated according to this invention. This plasma generator is useful particularly in introducing a pulverized or elongated material (metal or non-metal) in the midst of the plasma flame and in melting or performing a desired chemical reaction. When the plasma generator is operated with the flow rates of different gases controlled according to this invention, the plasma flame is in alignment, thus eliminating the possibility of uneven heating of the material in the plasma flame or preventing the heated material from flying in wrong directions away from a target which is subjected to coating with the material.

The plasma generator of FIG. 6 is the same as the plasma generator of FIG. 1 except for: Torch A and Torch B being connected to each other via an insulator 57 and means 58 for inserting a material into the plasma flame being connected to Torch A via an insulator. The inlet pipe 58 is directed to the "hair-pin" arc. As shown, the throttle 30 of the second bushing 26 is bent with respect to the central axis of Torch B, thereby allowing the access of a workpiece to the place where the material from the inlet pipe is heated.

The plasma generating apparatus was operated in the same way as mentioned earlier, and one leg 20 of the "hair-pin" arc was quite stable from the super-sonic to low speed plasma stream, the latter of which forms an elongated laminar flow of plasma flame. The material could be fed to the midst of the plasma flame and the leg 20 of the hair pin arc without fear for disturbing the plasma flame.

As an example a plasma generating apparatus having a triple bushed torch as a substitute for Torch A in FIG. 6 was operated with the flow rates of different gases as follows:

$Q_{12}$: argon 0.2 l/min.,
$Q_{11}$: air 0.15 l/min., and
$Q_2$: air 2.5 l/min.

The arc voltage was 170 volts, and the arc current was 130 amperes. A laminar plasma flame which was about 40 centimeters long was formed, and pulverized alumina when introduced, was turned into spheres 400 microns or mode in diameter. Growing to such large spheres would have been impossible if the plasma generating apparatus had been operated according to a conventional operating method. Now, a method of operating a plasma generating apparatus including a single plasma torch structure according to this invention is described hereinafter.

According to this invention such a plasma generating apparatus is operated by supplying to the channel or channels in side of a multi-bushed torch unit a gas the flow rate of which is equal to or larger than the flow rate at the coordinate of the valley point on the thermal loss-to-inside gas flow rate curve, which has been plotted which operating the multi-bushed torch unit and a counter multi-bushed torch unit as "Positive" and "Reverse" Polarity Torches respectively in the mode of operating a dual plasma torch structure. The same principle can be applied to a single-torch structure because the single-torch structure when used, for instance, in cutting or welding a workpiece, constitutes a pseudo dual-torch structure in which a "hair-pin" arc extends from the torch unit to the workpiece, which functions like a counter or Reverse Polarity torch unit.

Figure 7:
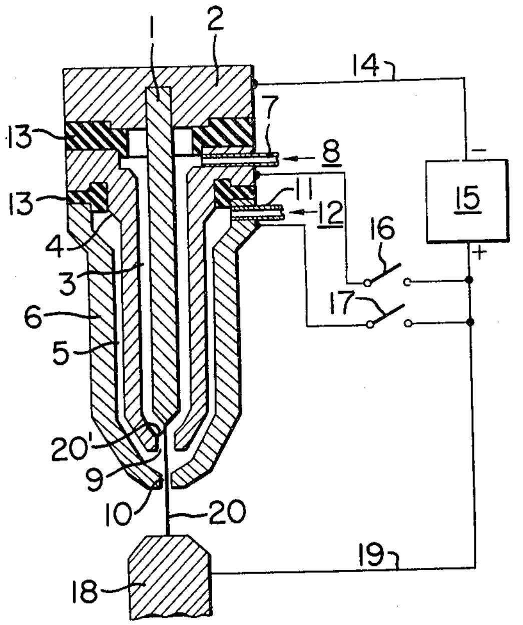
FIG. 7 show diagrammatically a plasma generating apparatus including a single plasma torch structure which can be operated according to this invention.

Referring to FIG. 7, there is shown a plasma generating apparatus including a single plasma torch structure, which is to work as Positive Polarity Torch. As shown, the plasma torch structure comprises a torch unit having two bushings. Specifically, it has a cathode rod 1, a cathode holder 2, a first bushing 4 surrounding the cathode rod and defining a first annular channel 3, and a second bushing 6 surrounding the first bushing and defining a second annular channel 5. In operation argon, helium or any other gas which is chemically inactive to the material of the electrode is supplied to the first annular channel 3 through the gas inlet 7, and is ejected from the throttles and 10 of the torch unit. An inactive gas is supplied to the second annular channel 5 through the gas inlet 11, and a ejected from the throttle 10 of the torch unit. The holder 2, the first bushing 4, and the second bushing 6 are electrically isolated from each other by insulators 13. The holder 2 is connected to the negative terminal of a power supply 15 by a conductor 14 whereas the first and second bushings 4 and 6 are connected to the positive terminal of the power supply via the switches 16 and 17. A water-cooled rod electrode 18 is connected to the positive terminal of the power supply 15 by a conductor 19.

In operation the switches 16 and 17 are closed. The first gas 8 is supplied to the annular channel 3, and an arc 20' is established between the cathode rod 1 and the first bushing 4 with the aid of a high-frequency power supply in the electric source 15. Then, the arc foot is shifted to the counter electrode 18 by opening the switches 16 and 17 one after another. And then the second gas 12 is supplied to the annular channel 5 through the inlet 11 and the first gas 8 is stopped. The arc current is increased to a proper amount for the purpose by adjusting the electric source 15. Operating the torch without any gas flow in the first channel 3 is most effective to avoid the unstability of the arc due to a deformation in the cathode if any, as described in Japanese Pat. No. 663,311. According to this invention the first and second gases the flow rates of which are determined in the same way as described earlier in connection with the dual-plasma torch structure, are supplied to the first and second annular channels 3 and 5, respectively. When the first and second gases flow in the first and second annular channels at the sodetermined flow rates, the established arc is in alignment, thereby permitting the substantial increase of the current density output available.

Specifically, the multi-bushed torch unit shown in FIG. 7 is combined with another multi-bushed torch unit in the same way as shown in FIG. 1, and the dual torch structure thus formed is operated in the same way as described earlier with reference to FIG. 1.

Figure 8:
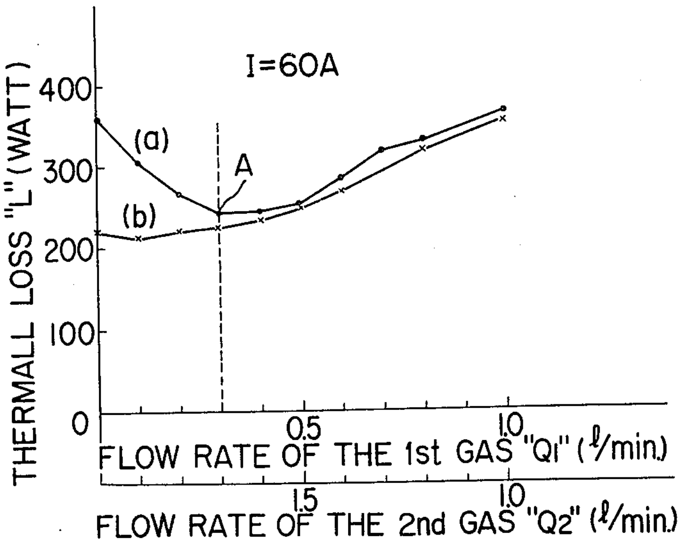
FIGS. 8 and 9 shows the thermal loss-to-inner gas flow rate characteristics of the plasma generating apparatus of FIG. 7.
Figure 9:
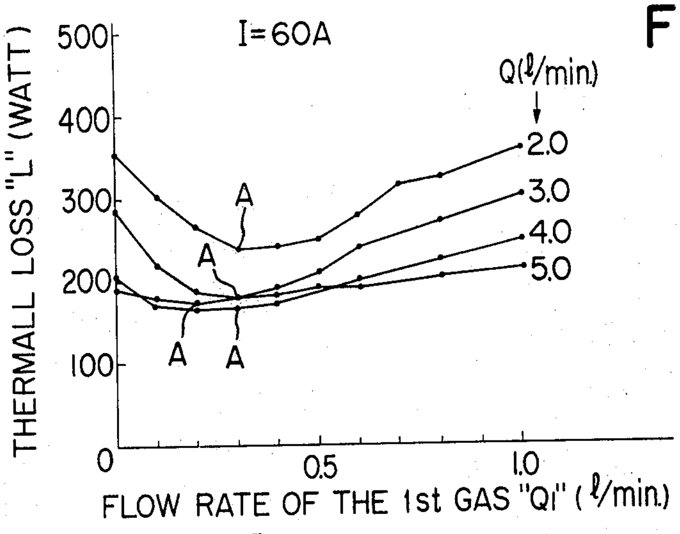

The curve (a) in FIG. 8 was plotted to show the "L"-to-"$Q_1$" (or "$Q_2$") characteristics. From the abscissa of the valley point "A" the flow rate "$Q_1$" of the first gas 8 was determined to be equal to or larger than 0.3 l/min. whereas the flow rate "$Q_2$" of the second gas 11 was determined to be equal to and less than 1.7 l/min. as the remainder in substracting the so determined "$Q_1$" from the fixed total flow rate as much as 2.0 l/min. For the sake of contrast the curve (b) was plotted to show the "L"-to-"$Q_1$" (or "$Q_2$") characteristics in case where the plasma generating apparatus of FIG. 7 worked alone while keeping "$Q_1$" plus "$Q_2$" at a given constant. The inventor has experimentally confirmed that the arc remains unstable before "$Q_1$" passes the valley point on the curve (a) or before "$Q_1$" passes the corresponding point on the curve (b) and that the arc is stable after "$Q_1$" passes the critical points on these curves (a) and (b). Another examples of the "L"-to-"$Q_1$" characteristics are given in FIG. 9.

Figure 10:
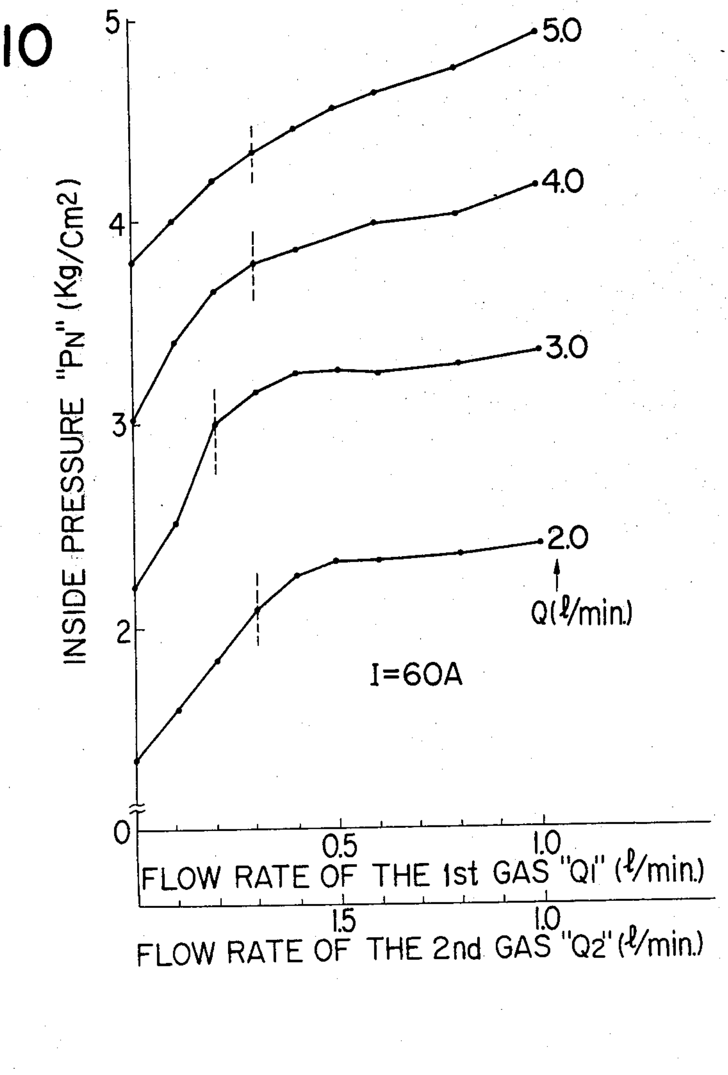
FIGS. 10 and 11 shows the inside pressure-to-inner gas flow rate characteristics of the plasma generating apparatus of FIG. 7.
Figure 11:
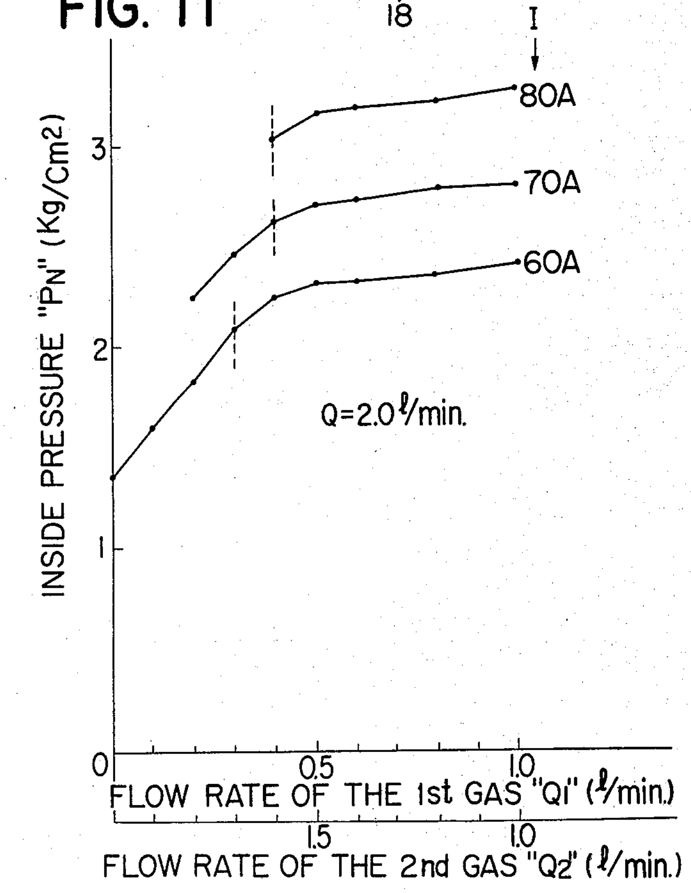

Referring to FIGS. 10 and 11, inside pressure "$P_N$" (the pressure in the second annular channel 5 of Torch A)-to-flow rate of the first gas "$Q_1$" curves are plotted for different "Q"s and for different "I"s, respectively. In FIG. 10 the critical flow rates of the first gas are indicated by broke lines on the curves. The inside pressure "$P_N$" which is directly proportional to the output of the torch if "Q", "I" and the shape and size of the throttle are not changed, increases rapidly with "$Q_1$" upto the critical values of "$Q_1$", and then the inside pressure "$P_N$" increases gradually to saturation point. As seen from this inclination, the torch is put in condition for generating almost maximum output if "$Q_1$" is maintained above the critical value. As for the point at which the increase of "$Q_1$" beyond the critical value is to stop while maintaining "$Q_1$" plus "$Q_2$" at a given constant, the same as earlier mentioned with reference to FIG. 4 holds for the single plasma torch structure. The inventor experimentally confirmed that the maximum current at the critical inner gas flow rate "$I_c$" is about 1.5 times as large as the one which could be estimated if the torch had been operated according to a conventional operating method in which no first gas flows (See cruve (1) in FIG. 4).

Figure 12:
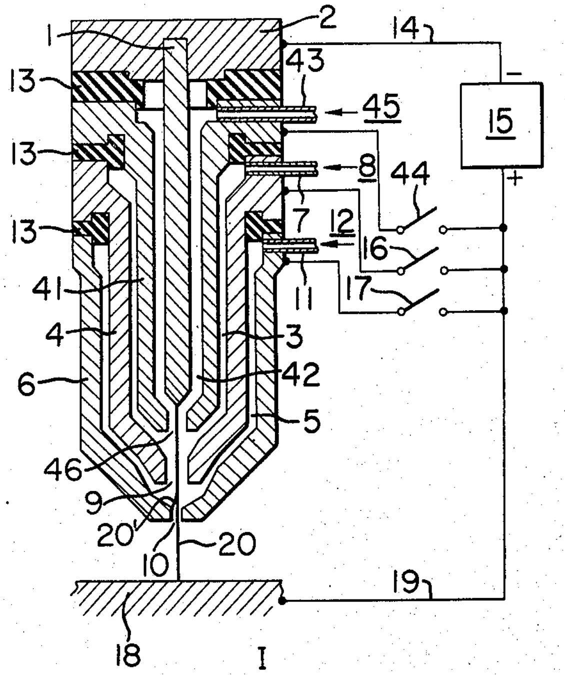
FIG. 12 shows diagrammatically another plasma generating apparatus including a single plasma torch structure which can be operated according to this invention.

Referring to FIG. 12 there is shown another plasma generating apparatus including a single plasma torch structure which can be operated according to this invention.

In operation:

(1) The switches 44, 16 and 17 are closed. A third inactive gas 45 is supplied to the annular channel 42 through the inlet 45. An electric arc is established between the cathode rod 1 and the third bushing 41 with the aid of the high-frequency power supply in the electric source 15. The switches 44 and 16 are opened one after another, thereby causing the arc foot to shift to the second bushing 6.

(2) Then, the flow rates "$Q_{11}$" "$Q_2$" and "$Q_{12}$" of the first, second and third inactive gases 8, 12 and 43, and the electric current "I" are controlled to the optimum values, and then the switch 17 is opened to establish an arc 20.

(3) Then, the first and second gases 8 and 12 are replaced by an active gas, thus establishing an arc of active gas plasma.

The torch is combined with another torch so as to constitute a dual plasma torch structure as shown in FIG. 1, and the thermal loss "L" of the second bushing 6 is measured in terms of the temperature of the cooling water while increasing the flow rate "$Q_{11}$" of the first active gas 8, keeping "Q" ($Q_{12}+Q_{11}+Q_2$) at a given constant. Then, an "L"-to-"$Q_1$" ($=Q_{11}+Q_{12}$) curve is plotted to determine the abscissa of the valley point on the curve. The flow rate "$Q_{11}$" of the active first gas 8 is determined as the remainder in substracting the fixed flow rate "$Q_{12}$" of the inactive third gas 43 from the abscissa of the valley point. Specifically the inactive gas as much as required to protect the cathode rod 1 is supplied to the annular channel 42 and the active gas is supplied to the first annular channel 3 at a flow rate which is equal to and larger than the abscissa of the valley point A. Then, the arc thus established is a stable, thereby enabling the substantial increase of the density of electric current and enabling the establishment of a high-concentrated active gas plasma arc, as seen from the following example, in which:

Throttle 46 of the 3rd bushing: 2.6 mm in diameter, 2.0 mm long

Throttle of the 1st bushing: 4.0 mm in diameter, 3.0 mm long

Throttle 10 of the 2nd bushing: 1.0 mm in diameter, 0.7 mm long

Flow rate $Q_{12}$ (argon): 0.25 l/min.

Flow rate $Q_{11}$ (air) 0.15 l/min.

Flow rate $Q_2$ (air) 5/6 l/min.

The inside pressure "$P_N$" was 5 kg/cm$^2$, and the electric current "I" was 90 amperes (the current density being 115 A/mm$^2$). The torch worked in the stable condition at 96 percent air concentration.

The critical ratio of the inside gas flow rate-to-the outside gas flow rate which assures the alignment of the arc in a torch unit can be experimentally determined in a different way as described earlier. No first gas is supplied to the inside channel around the cathode rod of a single plasma torch structure whereas a second gas is supplied to the outside channel around the inside channel. Then, an electric arc is established from the cathode rod to a workpiece, which constitutes a counter electrode, in the form of a "hair-pin" arc and then, the thermal loss "$L_o$" at the outermost bushing is determined. The workpiece is relocated to such a position that no "hair-pin" arc appears, and an electro-magnetic force is applied perpendicular to the space between the throttle of the outermost bushing and the throttle of the inside bushing, thereby causing the arc to deviate towards the inside wall of the throttle of the outermost bushing. The strength of the magnetic field is varied to cause the thermal loss equal to the one "$L_o$" caused by the "hair-pin" arc. Then, a first gas is supplied to the inside channel around the cathode rod of the torch unit. While increasing the flow rate of the first gas and accordingly decreasing the flow rate of the second gas, the thermal loss is measured. Thus, the thermal loss-to-the inside gas flow rate curve is plotted to find the coordinate of the valley point on the curve.

What is claimed is:

1. A method of operating a single plasma torch generating apparatus which comprises determining the thermal loss at the outermost bushing by operating said torch structure with a gas flowing only in the outside channel thereby causing a "hair-pin arc" to appear from the cathode rod to a workpiece; relocating the workpiece to such a position that no "hair-pin arc appears; applying a magnetic force perpendicular to the space between the throttle of the outermost bushing and the throttle of the inside bushing so as to cause a thermal loss equal to the thermal loss caused by the "hair-pin" arc; measuring the thermal loss while increasing the flow rate of a first gas in the inside bushing and accordingly decreasing the flow rate of a second gas in the outside bearing, plotting the thermal loss to the inside gas flow rate curve to determine the coordinate of the valley point on the curve; and operating said torch structure by adjusting and maintaining the flow rate of the first gas equal to or larger than the coordinate of the valley point and the flow rate of the second gas equal to the remainder when subtracting the flow rate of the first gas from the fixed total flow rate of first and second gases, so as to maintain the electric arc of the torch unit in alignment with the center axis of said torch unit.

* * * * *

UNITED STATES PATENT AND TRADEMARK OFFICE
CERTIFICATE OF CORRECTION

PATENT NO. : 4,341,941
DATED : July 27, 1982
INVENTOR(S) : Haruo TATENO

It is certified that error appears in the above-identified patent and that said Letters Patent are hereby corrected as shown below:

Claim 1, column 12, line 3, delete "bearing" and substitute --bushing--.

Signed and Sealed this

*Fifth* Day of *October 1982*

[SEAL]

*Attest:*

GERALD J. MOSSINGHOFF

*Attesting Officer* *Commissioner of Patents and Trademarks*